(12) United States Patent
Hrusecky et al.

(10) Patent No.: US 7,318,127 B2
(45) Date of Patent: Jan. 8, 2008

(54) METHOD, APPARATUS, AND COMPUTER PROGRAM PRODUCT FOR SHARING DATA IN A CACHE AMONG THREADS IN AN SMT PROCESSOR

(75) Inventors: David Allen Hrusecky, Cedar Park, TX (US); Sheldon B. Levenstein, Austin, TX (US); Bruce Joseph Ronchetti, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/055,820

(22) Filed: Feb. 11, 2005

(65) Prior Publication Data

US 2006/0184741 A1    Aug. 17, 2006

(51) Int. Cl.
  *G06F 12/14* (2006.01)
(52) U.S. Cl. ........................... 711/145; 711/144
(58) Field of Classification Search ............... None
  See application file for complete search history.

(56) References Cited

U.S. PATENT DOCUMENTS

| | | | |
|---|---|---|---|
| 5,933,848 A * | 8/1999 | Moenne-Loccoz | 711/113 |
| 6,324,623 B1 * | 11/2001 | Carey | 711/148 |
| 6,427,195 B1 * | 7/2002 | McGowen et al. | 711/153 |
| 6,848,026 B2 * | 1/2005 | DeSota et al. | 711/129 |

* cited by examiner

*Primary Examiner*—T Nguyen
(74) *Attorney, Agent, or Firm*—Duke W. Yee; Diana R. Gerhardt; Lisa L. B. Yociss

(57) ABSTRACT

A method, apparatus, and computer program product are disclosed in a data processing system for sharing data in a cache among multiple threads in a simultaneous multi-threaded (SMT) processor. The SMT processor executes multiple threads concurrently during each clock cycle. The cache is dynamically allocated for use among the multiple threads. Portions of the cache are capable of being designated to store private data that is used exclusively by only a first one of the threads. The portions of the cache are capable of being designated to store shared data that can be used by any one of the multiple threads. The size of the portions can be changed dynamically during execution of the threads.

14 Claims, 11 Drawing Sheets

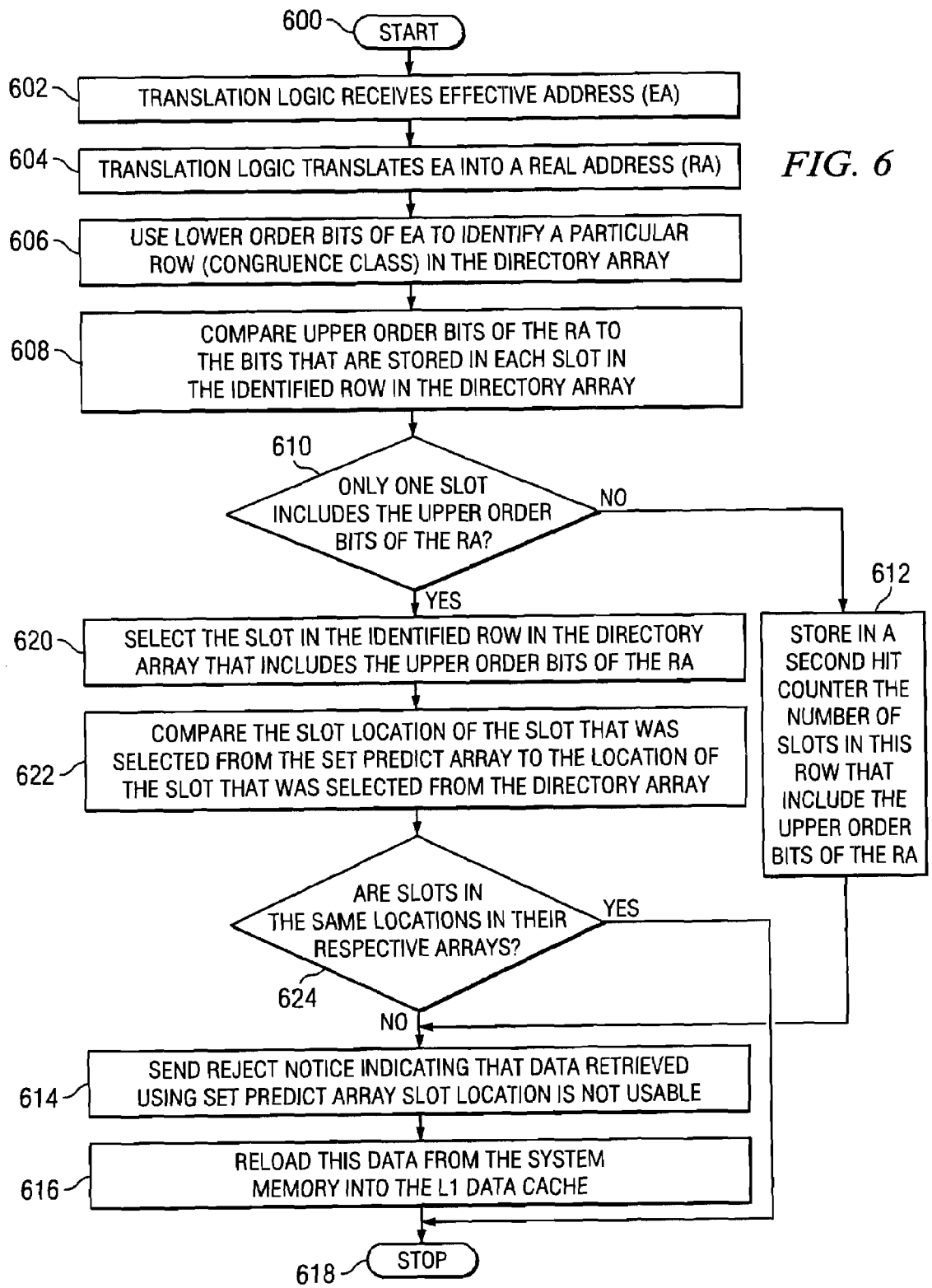

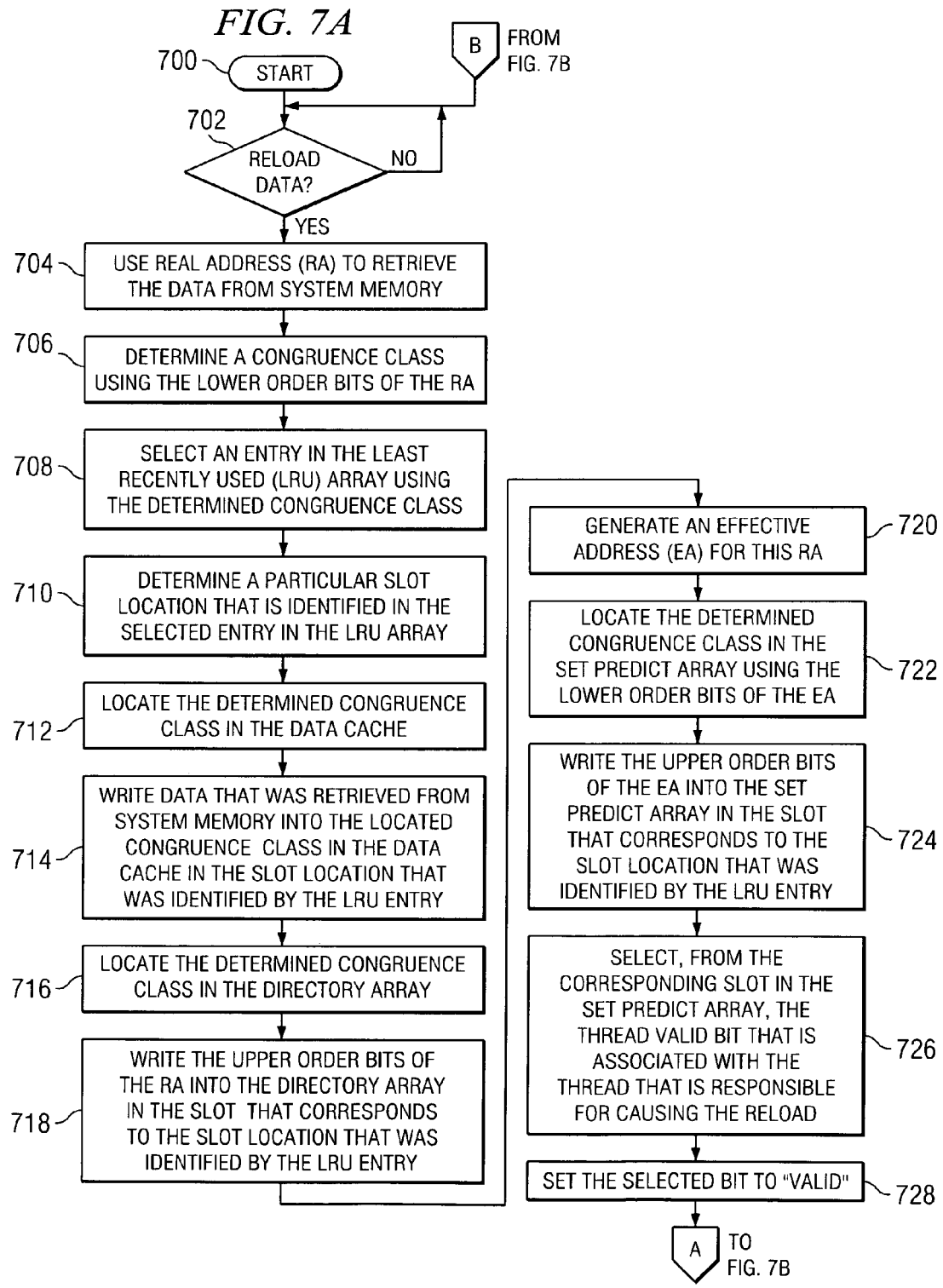

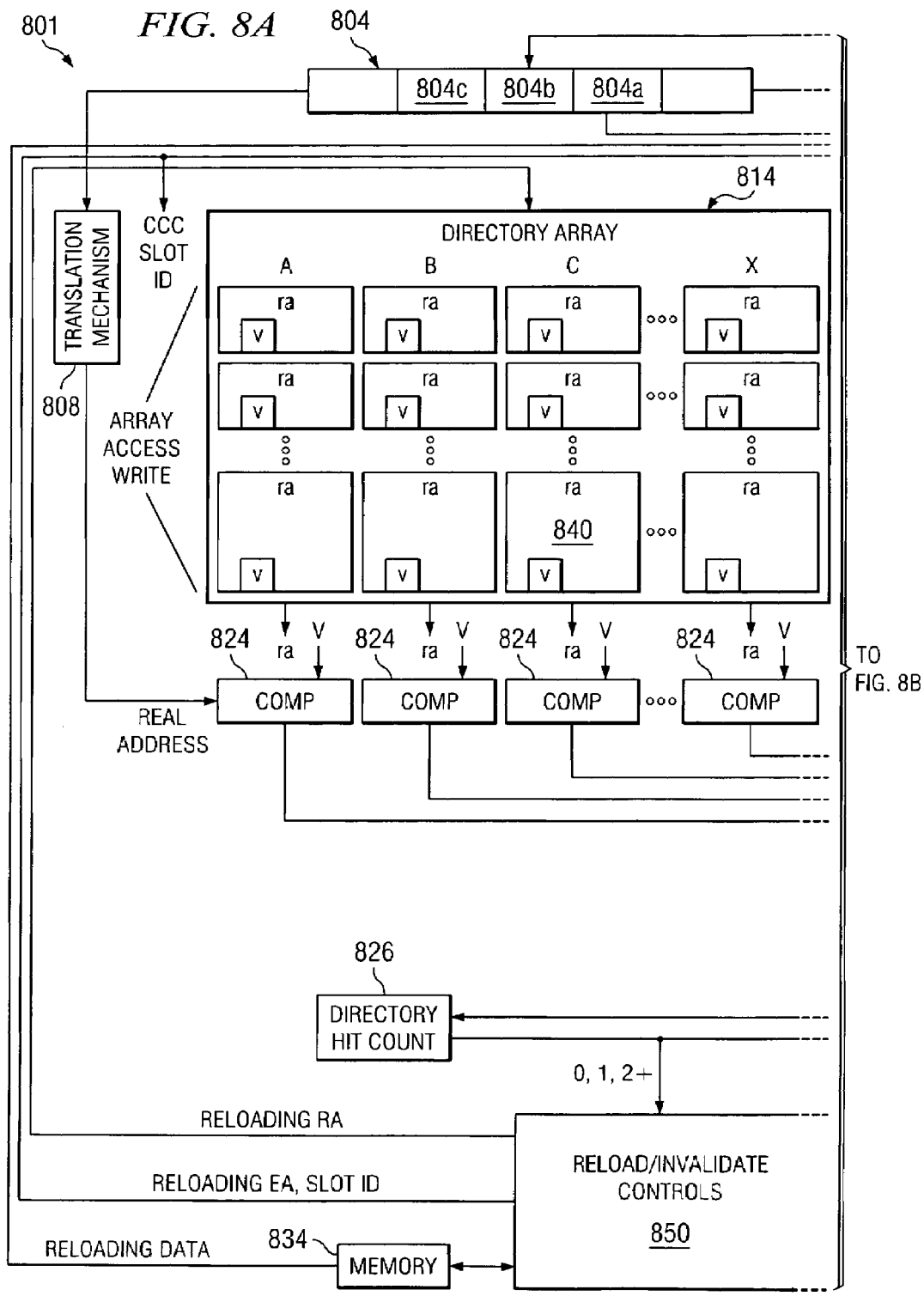

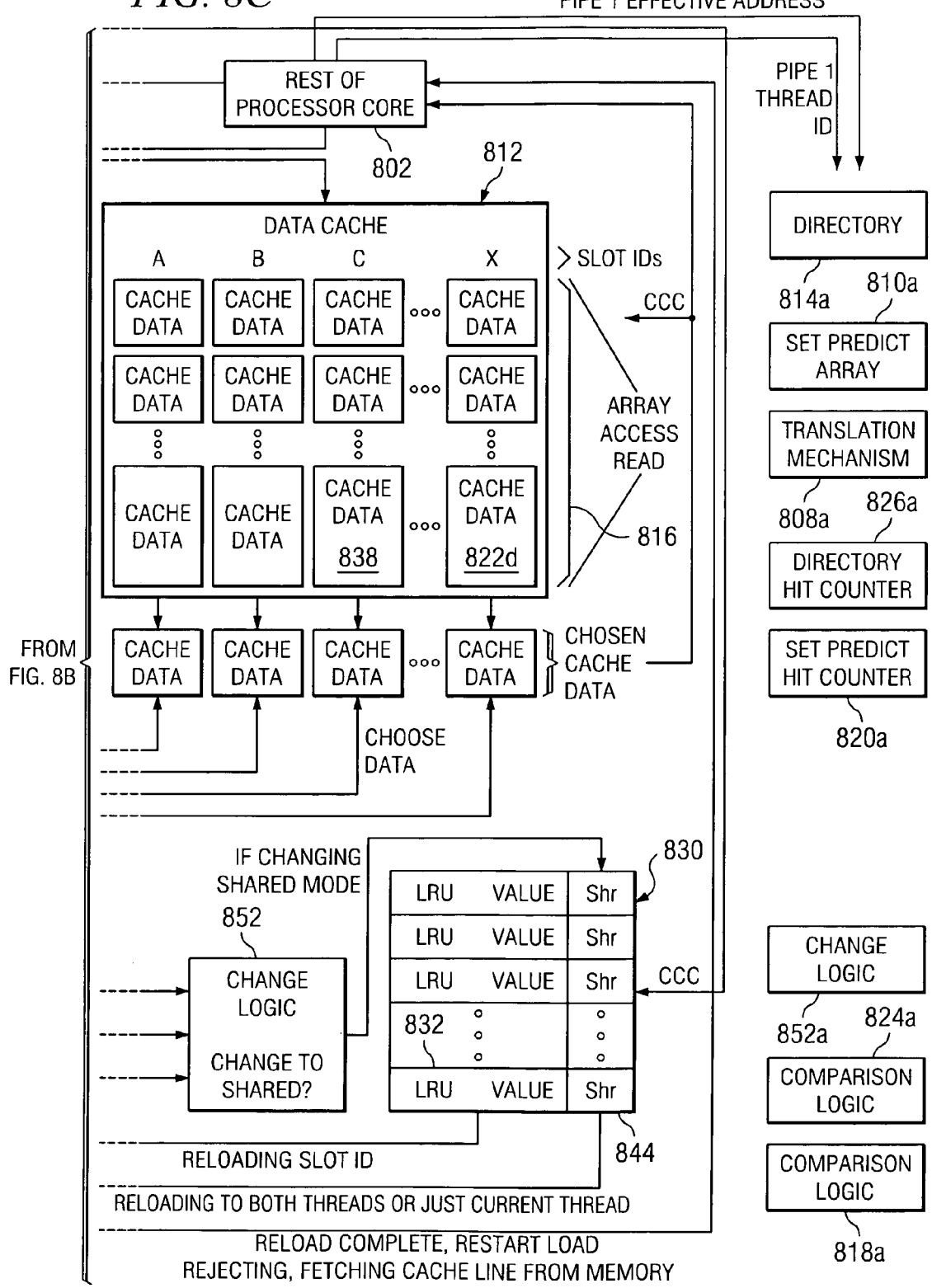

METHOD, APPARATUS, AND COMPUTER PROGRAM PRODUCT FOR SHARING DATA IN A CACHE AMONG THREADS IN AN SMT PROCESSOR

BACKGROUND OF THE INVENTION

1. Technical Field

The present invention is directed to data processing systems and more particularly to microprocessors. Still more specifically, the present invention is directed to a method, apparatus, and computer program product for sharing data in a cache among threads in a simultaneous multi-threaded processor.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor.

Known systems can include a shared processor where the shared processor is shared among the various processes that are being executed by the system. The shared processor can be either an SMP or SMT type of processor.

A shared processor may be part of a logically partitioned system and shared among the various partitions in the system. These systems typically include firmware, also called a hypervisor, that manages and enforces the partitioning and/or sharing of the processor. For example, a hypervisor may receive a request from the system to dispatch a virtual processor to a physical processor. The virtual processor includes a definition of the work to be done by a physical processor as well as various settings and state information that are required to be set within the physical processor in order for the physical processor to execute the work. In known shared processor systems, the hypervisor supervises and manages the sharing of a physical processor among all of the logical partitions.

A multithreaded (SMT) processor fetches data from memory and stores it into a single L1 data cache array. Each thread that is processed by this processor needs to have space allocated to it in the L1 cache. A problem arises when decisions are made as to how to equitably divide the L1 data cache to distribute enough storage space in the cache for each thread's use.

One approach to dividing the cache is to divide the total storage space provided by the L1 cache into two equal pieces that are a fixed static size. In this case the L1 cache is segregated into two areas, each area dedicated to one of the threads. Each thread will have its own dedicated portion of the L1 cache. The size of each piece will not change during while the threads are executing.

This approach may cause the performance of one of the threads to suffer. In cases where a first thread requires a larger storage area in the cache and the other thread does not need its half of the cache, performance of the first thread suffers.

Sharing happens normally in a system environment in the operating system. In these cases, there may be critical variables that both threads will be fetching and could possibly be storing at the same time. In this case, it is desirable to allow the concurrent fetching and/or storing of the data by one thread without invalidating the cache line of the same data being used by the other thread.

In addition, when running multiple copies of the same program for benchmarking, two threads may be using the same effective addresses, but may or may not be using the same real addresses. In this case, if the real addresses are different, it is desirable to avoid thrashing the data cache. Thrashing occurs when two different processes continually insist on having their data occupy the same logical location in the cache. Usually the installed data resides in the location for a minimum time such that only a few elements of the entire data are actually consumed by the process before the data is evicted again by the other process.

Therefore, a need exists for a method, apparatus, and computer program product for sharing data in a cache among threads in a simultaneous multi-threaded processor.

SUMMARY OF THE INVENTION

A method, apparatus, and computer program product are disclosed in a data processing system for sharing data in a cache among multiple threads in a simultaneous multi-threaded (SMT) processor. The SMT processor executes multiple threads concurrently during each clock cycle. The cache is dynamically allocated for use among the multiple threads. Portions of the cache are capable of being designated to store private data that is used exclusively by only a first one of the threads, or designated to store shared data that can be used by any one of the multiple threads. The size of the portions can be changed dynamically during execution of the threads.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a high level flow chart that depicts determining whether to reload data in accordance with the present invention;

FIGS. 7A and 7B together depict a high level flow chart that illustrates utilizing a shared mode bit to determine whether data that is reloaded into the data cache will be shared in accordance with the present invention.

DETAILED DESCRIPTION OF THE PREFERRED EMBODIMENT

Figure 1:
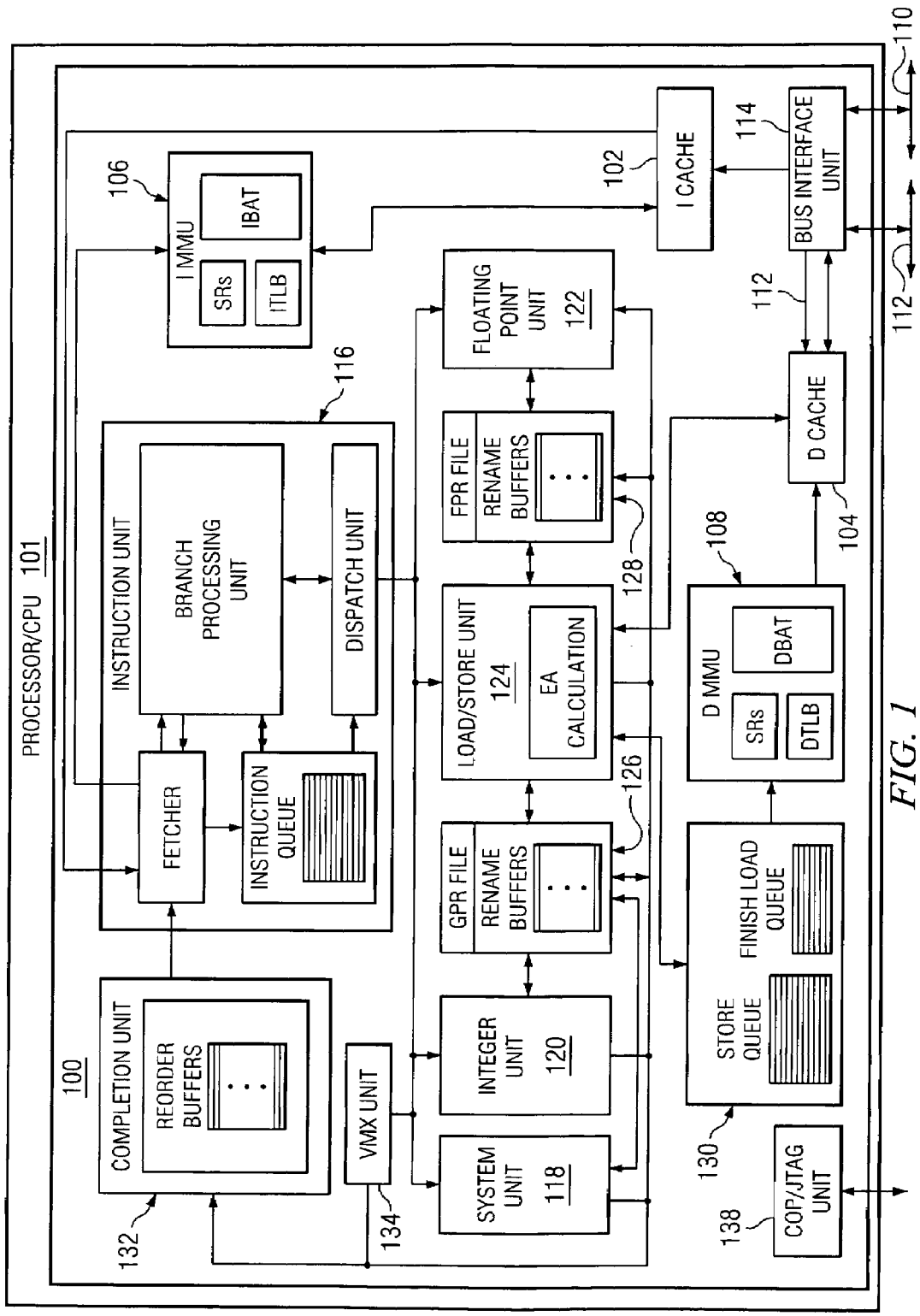
FIG. 1 is a block diagram of a superscalar processor that can be used to implement the present invention in accordance with the present invention.

A preferred embodiment of the present invention and its advantages are better understood by referring to the figures, like numerals being used for like and corresponding parts of the accompanying figures.

The present invention is a method, apparatus, and computer program product in a data processing system for sharing data in a cache among multiple threads in a simultaneous multi-threaded (SMT) processor. The SMT processor executes multiple threads concurrently during each clock cycle.

In the preferred embodiment, the SMT processor concurrently executes two threads. Those skilled in the art will recognize that more than two threads may be concurrently executed. The present invention may also be implemented in a system where more than two threads are concurrently executed.

The data in the cache can be shared or private data. The shared data is shared between the threads being executed by the processor core. When data is marked as being shared, it is valid for use by any thread. When data is marked as being valid for only one of the threads, it cannot be shared. In the case where the data is marked as being valid for only one of the threads, the data is private data for that thread's exclusive use.

By using the present invention, the data cache is dynamically allocated between the threads. Portions of the cache can be designated as being valid for each thread. When a portion is designated as being valid for each thread, the data in that portion can be used by any thread. Thus, the portion designated as being valid for each thread is allocated for use by all threads.

These same portions can later be designated as being valid for only one thread. When a portion is designated as being valid for only one thread, the data in that portion can be used by only that particular thread.

These designations can be changed dynamically during the execution of the threads. When the designation is changed, the next time a thread attempts to access this data, the thread will read and respond to the changed designation. In this manner, the allocation of the cache is dynamic.

In addition, the size of the portion that is designated for the various threads is variable. At any one time the data cache can be divided into a first portion that is designated for the exclusive use of a one thread, a portion that is designated for the exclusive use of the other thread, and a portion that is designated as shared between the two threads. The size of each portion may change from one clock cycle to the next as the designations are changed.

By providing dynamic designation of a variable portion of the total data cache, the allocation of the data cache among the threads is always optimized. The thread that requires the larger portion of the storage area provided by the data cache will always receive a larger portion. In addition, the allocation is optimized so that data need not be duplicated in the data cache when that data can be shared among the threads.

The present invention provides two valid bits for each data address that is stored in the data cache, one valid bit for each thread. Thus, each valid bit is associated with one of the two threads being executed by the processor. A valid bit will indicate whether the particular data is valid for the thread that is associated with the valid bit. If the thread valid bit is set to "valid" for a particular thread, the data can be used by that thread. If the thread valid bit is set to "invalid" for a particular thread, the data can not be used by that thread.

For particular data, only one valid bit could be set to "valid" while the other valid bit is set to "invalid". In this case, the portion of the data cache in which the data is stored is dedicated to only that thread that is associated with the valid bit that is set. The data cannot be used by the thread that is associated with the valid bit that is not set.

For the particular data, the valid bits could both be set to "valid". In this case, the data can be used by either thread. This data, then, is shared between the threads. In this case, the portion of the data cache in which the data is stored is shared by both threads.

The present invention also provides a shared mode bit that indicates when sharing particular data is permitted. When the shared mode bit is set to "shared", when data is reloaded into the data cache both thread valid bits for this data will be set to "valid" indicating that the data can be used by either thread. In this case, the data is shared data, and the portion of the data cache in which that data is stored is shared among all of the threads.

When the shared mode bit is set to "not shared", when data is reloaded into the data cache only the thread valid bit for the thread that caused the data to be stored in the data cache will be set to "valid". This indicates that the data can be used by only the thread that caused the data to be reloaded into the data cache. In this case, the data is private data, and the portion of the data cache in which that data is stored is dedicated to only that particular thread's use.

The current setting of the shared mode bit may be changed from "not shared" to "shared" or from "shared" to "not shared". One example of the circumstances that require changing the current setting of the shared mode bit is given below. Those skilled in the art will recognize that any suitable set of circumstances for altering the current setting of the shared mode bit can be used.

The present invention describes an environment that includes an L1 caching design that uses a set predict array in addition to a traditional real address matching translation scheme. The set predict array is used to do an early selection of the set, or slot, of data that is made available from an N-way set associative caching system.

The prediction is used to select data from among the N sets and then to send it to the processor core. The criteria for the making of a prediction is itself an N-way associative array. Thus, the set predict array is an N-way associative array.

The data cache array, directory array, and the set predict array are all N-way associative arrays. Data is stored in the data cache array. Real addresses are stored in the directory array. Effective addresses are stored in the set predict array. Data is retrieved from the data cache array using either real addresses and the directory array or effective addresses and the set predict array.

The selection into the data cache array, directory array, and the set predict array is based on a match of the address included in an instruction with an address that is stored in the directory array and set predict cache array. The effective address is used for indexing into the set predict array, the data cache, and the directory array. The effective address is used to determine a particular congruence class. Once this congruence class is determined, it applies across all arrays.

When there is one match into the set predict array and one match into a corresponding location in the directory array, a normal cache hit has occurred. When a normal cache hit occurs, the data that is located in the corresponding location in the data cache is retrieved from the data cache. In some other cases, a cache miss or error has occurred and the data must be reloaded into the data cache.

In order to optimize the retrieval of data from the data cache, the effective address of the data to be retrieved is first used to access the set predict array. If a hit occurs in the set predict array for the particular effective address, the data from the slot in the data cache that corresponds to the slot in the set predict array where the hit occurred is retrieved and sent to the processing unit that requested the data.

In parallel with this process, a verification process is also performed. This verification process takes the effective address, translates it into a real address, and uses that real address to access the directory array. If there is one hit in the directory array in the slot that corresponds to the location in the set predict array where there was one hit, the data is verified as being good data. Otherwise, the data that was sent to the requesting processing unit that was retrieved using the set predict array is considered to be not usable data. That data that was retrieved using the set predict array is then rejected, and the data is reloaded into the data cache from system memory, or there must be an invalidate.

When data is to be loaded into the data cache array, a least recently used (LRU) array is accessed. The LRU array includes one column and the same number of rows that are included in each of the other arrays. Therefore, if the other arrays include four rows and three columns, the LRU array will include four rows and one column.

When data is to be loaded into the data cache array, the data's congruence class is first determined. Each row of the arrays corresponds to a particular congruence class. A congruence class is determined using the a first consecutive portion of the data's effective address. Therefore, when data is to be loaded into the data cache array, the first portion of that data's effective address are used to determine the data's congruence class. The particular row in the LRU array that corresponds to the data's congruence class is selected.

The LRU array includes an identification in each of its entries of the least recently used slot in the data cache array for each congruence class. Thus, the entry for the particular row in the LRU array will indicate which slot in that congruence class is the least recently used in the data cache array. The data is then stored in the least recently used slot in the data class in that row that corresponds to that data's congruence class.

The lower order bits of the real address are then stored in the corresponding slot in that congruence class in the directory array. The lower order bits of the effective address are stored in the corresponding slot in that congruence class in the set predict array.

When data is requested from the data cache, the instruction that is requesting the data will provide the address of the data. The higher order bits of the data's address are used to select a particular row, i.e. congruence class, in the array. The upper order bits of the effective address are used to select a particular row, i.e. congruence class, of the directory array. The higher order bits of the effective address are used to select a particular row, i.e. congruence class, of the set predict array.

Once a particular row, i.e. congruence class, is selected, the upper order bits of the instruction are used to select a particular slot from that row. Upper order bits of effective addresses are stored in the slots in the set predict array. Upper order bits of real addresses are stored in the slots in the directory array.

According to the present invention, two thread valid bits are stored in each slot in the set predict array. The two thread valid bits are applicable to only the data that is associated with the slot in the set predict array where the valid bits are stored. In a system where each array includes four rows and three columns, for example, there are twelve total slots. Therefore, in the set predict array, there will be 24 total thread valid bits, two for each slot.

Each valid bit is associated with one of the two threads being executed by the processor. A valid bit will indicate whether the data that is associated with the slot that includes the valid bit is valid for that thread.

Each thread valid bit is set to "valid" or "invalid" when the data is reloaded into the data cache. The decision as to whether to set the thread valid bit to "valid" or "invalid" is made by determining the current setting of the shared mode bit for the congruence class for this data.

According to the preferred embodiment, the shared mode bits are stored in the LRU array. Each entry in the LRU array will include one shared mode bit. Each shared mode bit is associated with a particular congruence class. The shared mode bit will be set to either "shared" or "not shared". This setting then applies to every slot in the particular congruence class.

A simpler design of the present invention can be implemented by using only one shared mode bit for the entire data cache. In this case, the single shared mode bit is used to indicate whether all of the data in the cache can be shared or not. In this embodiment, the single bit could be stored anywhere in the system.

Particular events may be encountered when the directory array discovers that a thread is starting to encroach on the each other thread's storage space. In these cases, the current setting of the shared mode bit must be changed in order to stop sharing the data.

Initially when the data cache is first populated with data cache lines, the goal is to install as much of the data as possible as "shared" data. Thus, the default state is to start with the shared mode bit being set to "shared". Thereafter, in response to the occurrence of particular events, the current setting of the shared mode bit may be changed to "not shared".

Prior to describing the present invention in detail, the following, including the description with reference to FIGS. 1-4, is provided as a description of the environment in which the present invention may be executed.

A superscalar processor includes a number of stages, such as the following, in the processor pipeline. In a typical first stage, referred to as an instruction fetch stage, an instruction is fetched from memory or associative memory structure, each stage including one or more pipelines. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers. This stage is also sometimes called a write back stage since it is at this time that results of the execution of instructions are written back to designated locations such as registers.

With reference now to the figures, and in particular with reference to FIG. 1, FIG. 1 depicts a block diagram of a processor core in which a preferred embodiment of the present invention may be implemented. Processor core 100 is included within a processor/CPU 101 that is a single integrated circuit superscalar microprocessor (CPU), such as the PowerPC™ processor available from IBM Corporation of Armonk, N.Y. Accordingly, processor core 100 includes various processing units both specialized and general, registers, buffers, memories, and other sections, all of which are formed by integrated circuitry. Processor core 100 also operates according to reduced instruction set computing ("RISC") techniques.

Processor core 100 includes level one (L1) instruction and data caches ("I Cache" and "D Cache") 102 and 104, respectively, each having an associated memory management unit ("I MMU" and "D MMU") 106 and 108. As shown in FIG. 1, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue, and a dispatch unit.

The dispatch unit within instruction unit 116 dispatches instructions as appropriate to execution units such as system unit 118, integer unit 120, floating point unit 122, or load/store unit 124. The dispatch unit includes a dispatch clock cycle assignment register 117.

The dispatch unit outputs instructions to issue unit 119. Issue unit 119 includes an issue clock cycle assignment register 121. Issue unit 119 outputs instructions to floating point unit 122.

System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from prefetch unit 125 into integer registers 126, floating point registers 128, or VMX unit 134 as needed, and stores instructions results when available from integer registers 126, floating point registers 128, or VMX unit 134 into data cache 104. These instruction operands were loaded into prefetch unit 125 from data cache 104. Load and store queues 130 are utilized for these transfers from prefetch unit 125 to and from integer registers 126, floating point registers 128, or VMX unit 134. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor core 100 may include, for example, multiple integer and floating point execution units to increase processing throughput. All such variations are within the spirit and scope of the present invention.

Figure 2:
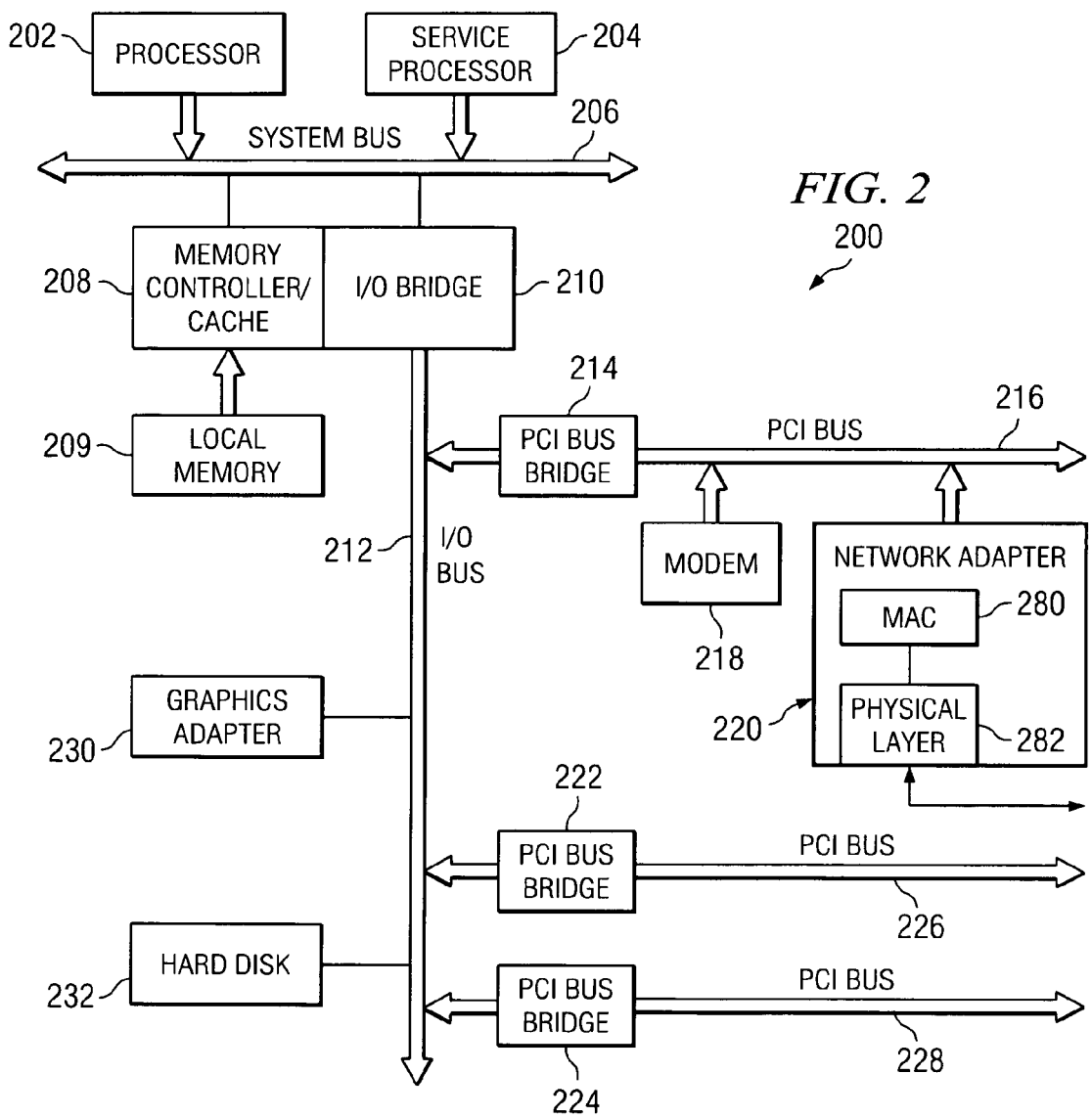
FIG. 2 is an illustration of a computer system which includes a processor, such as the one depicted by FIG. 1, in accordance with the present invention.

FIG. 2 is an illustration of a computer system which includes a processor, such as the one depicted by FIG. 1, in accordance with the present invention. Data processing system 200 may be a symmetric multiprocessor (SMP) system including a plurality of processors 202 and 204 connected to system bus 206. Alternatively, a single processor system may be employed. Each processor 202 and 204 may be an SMT-enabled processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
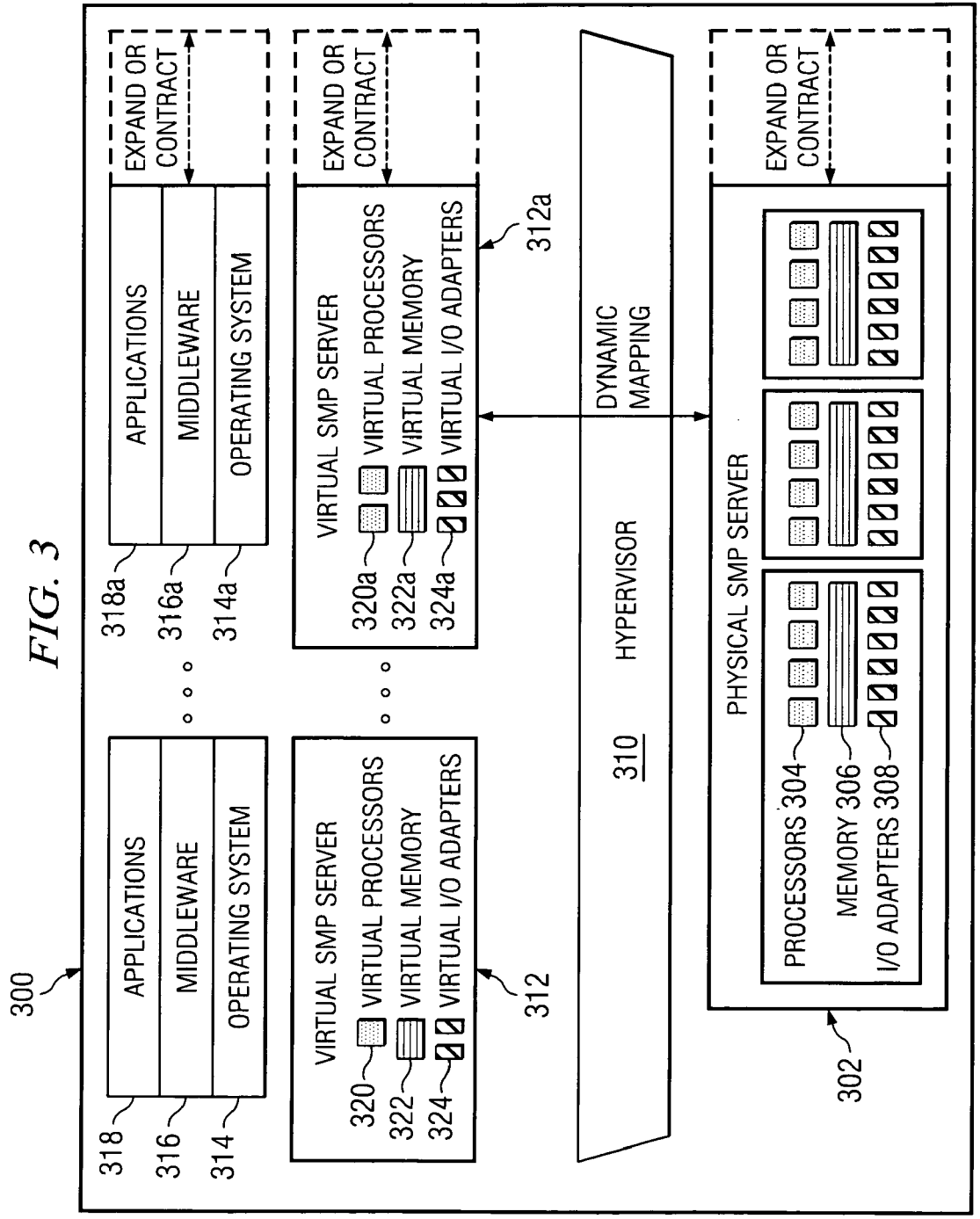
FIG. 3 is a block diagram of a data processing system, including a hypervisor, in which the present invention may be implemented.

FIG. 3 is a block diagram of a data processing system 300, including a hypervisor, in which the present invention may be implemented. System 300 is preferably a symmetric multiprocessing (SMP) server computer system. SMP server computer system 300 includes physical hardware devices that can be mapped to, i.e. temporarily owned by, a user application to execute that application.

SMP server computer system 300 includes a physical SMP server 302. Physical SMP server 302 includes physical hardware devices such as processors 304, memory 306, and I/O adapters 308. These physical devices are managed by hypervisor 310. Each one of the processors 304 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 300. A virtual server appears to be a physical SMP server to its user: the operating system, middleware, and application software that run upon it. SMP server computer system 300 includes one or more virtual servers such as virtual server 312 and virtual server 312a.

Each virtual server appears to its software to include its own virtual processor(s), memory, and I/O adapter(s) that are available for the exclusive use of that virtual server. For example, virtual server 312 includes a virtual processor 320, virtual memory 322, and virtual I/O adapters 324. Virtual server 312a includes virtual processors 320a, virtual memory 322a, and virtual I/O adapters 324a.

Each virtual server supports its own software environment, including an operating system, middleware, and applications. The software environment of each virtual server can be different from the software environment of other virtual servers. For example, the operating systems executed by each virtual server may differ from one another.

For example, virtual server 312 supports operating system 314, middleware 316, and applications 318. Virtual server 312a supports operating system 314a, middleware 316a, and applications 318a. Operating systems 314 and 314a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 310 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 304, is selected by hypervisor 310 to be used to execute and implement that virtual processor. Hypervisor 310 manages the selections of physical devices and their temporary assignment to virtual devices.

Hypervisor 310 is responsible for dynamically creating, managing, and destroying virtual SMP servers. Whole virtual processors, virtual I/O adapters, and virtual memory blocks can be removed or added by hypervisor 310. Hypervisor 310 is also responsible for dynamic resource allocation, managing time-sharing of physical resources, and altering the physical resource mapped to a processor without involving the operating system. Hypervisor 310 is also able to dedicate physical resources to virtual resources for situations where sharing is not desired. Hypervisor 310 is responsible for managing the addition or removal of physical resources. Hypervisor 310 makes these additions and deletions transparent to the upper level applications.

Figure 4:
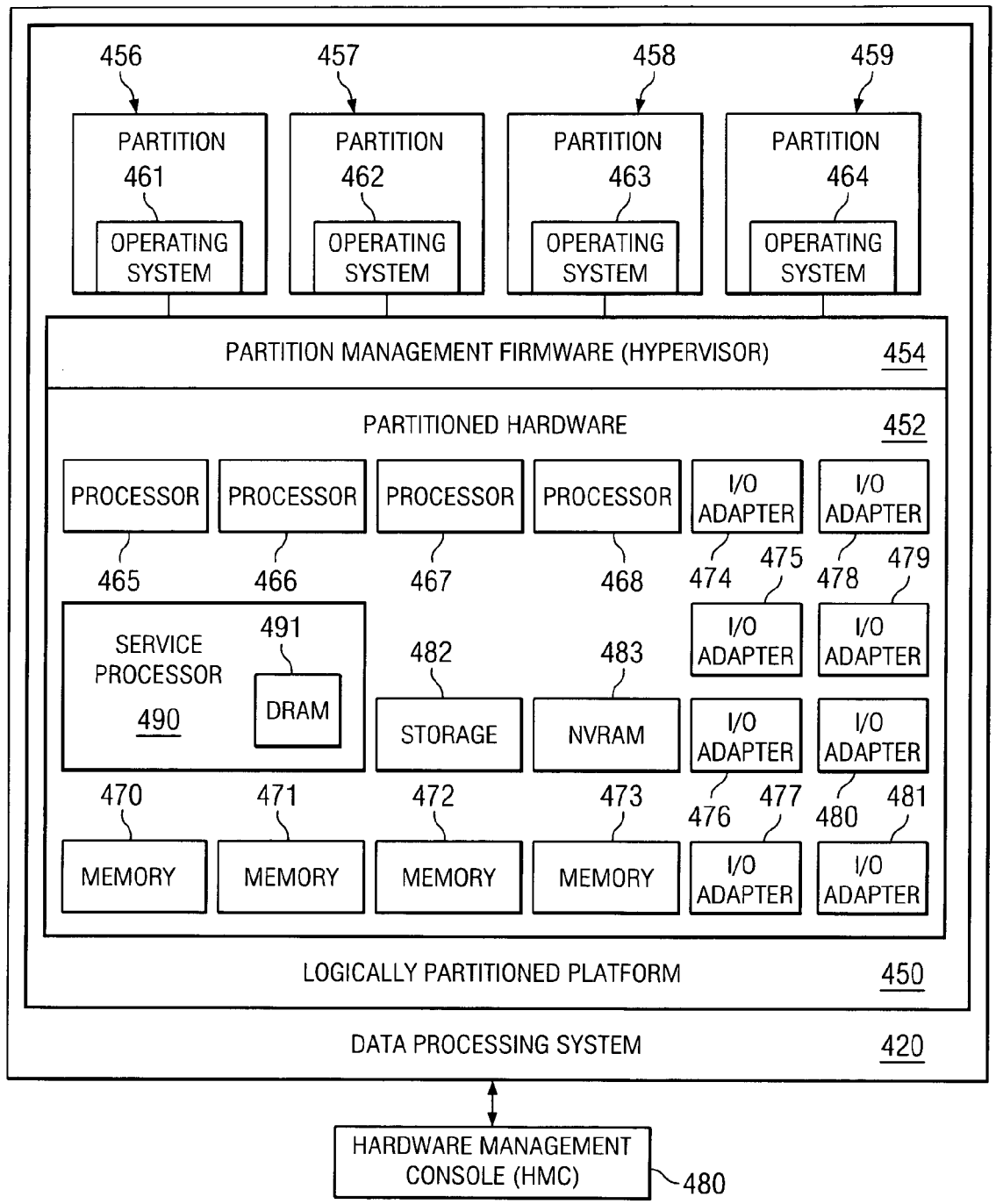
FIG. 4 is a block diagram of a logically partitioned platform that includes the present invention in accordance with the present invention.

FIG. 4 is a block diagram of a logically partitioned platform that includes the present invention. Data processing system 420 includes logically partitioned platform 450. Platform 450 includes partitioned hardware 452, partition management firmware, also called a hypervisor 454, and partitions 456-459. Operating systems 461-464 exist within partitions 456-459. Operating systems 461-464 may be multiple copies of a single operating system or multiple heterogeneous operating systems simultaneously run on platform 450.

Partitioned hardware 452 includes a plurality of SMT-capable processors 465-468, a plurality of system memory units 470-473, a plurality of input/output (I/O) adapters 474-481, and a storage unit 482. Each of the processors 465-468, memory units 470-473, NVRAM storage 483, and I/O adapters 474-481 may be assigned to one of multiple partitions 456-459. Partitioned hardware 452 also includes service processor 490. A non-volatile memory device 491, such as an NVRAM device, is included within service processor 490.

Partition management firmware (hypervisor) 454 performs a number of functions and services for partitions 456-459 to create and enforce the partitioning of logically partitioned platform 450. Hypervisor 454 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 454 allows the simultaneous execution of independent OS images 461-464 by virtualizing all the hardware resources of logically partitioned platform 450. Hypervisor 454 may attach I/O devices through I/O adapters 474-481 to single virtual machines in an exclusive mode for use by one of OS images 461-464.

A hardware management console (HMC) 480 may be coupled to service processor 490 in data processing system 420. HMC 480 is a separate computer system that is coupled to service processor 490 and may be used by a user to control various functions of system 420 through service processor 490.

Figure 5:
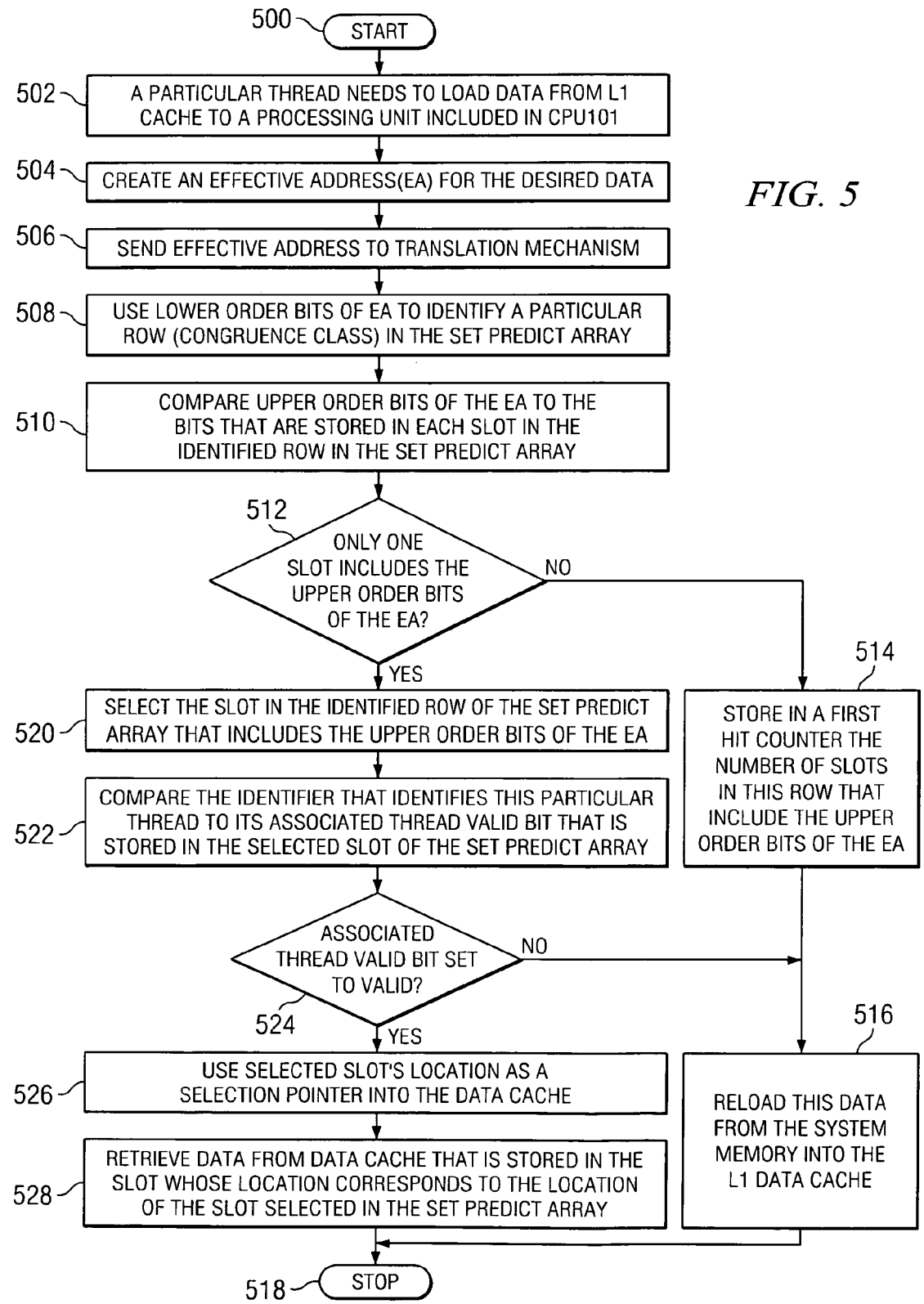
FIG. 5 depicts a high level flow chart that illustrates utilizing, by the load/store unit (LSU), thread valid bits to determine whether a particular thread can access data from a data cache in accordance with the present invention.

FIG. 5 depicts a high level flow chart that illustrates utilizing, by the load/store unit (LSU), thread valid bits to determine whether a particular thread can access data from a data cache in accordance with the present invention. This process is executed by the load/store unit. The process starts as depicted by block 500 and thereafter passes to block 502 which illustrates a particular thread needing to load particular data from a data cache, such as an L1 cache, to a processing unit that is included within a processor core. The particular data is identified using a real address. Next, block 504 depicts creating an effective address (EA) for the desired data from the data's real address.

The process then passes to block 506 which illustrates sending the effective address to the translation mechanism. Next, block 508 depicts using the lower order bits of the effective address to identify a particular row within a set predict array. Each row within an array, e.g. data cache array, directory array, or set predict array, belongs to a different congruence class. Each congruence class is identified using the lower order bits of the effective address. The row that represents one congruence class in one array corresponds to the same row in the other arrays. Next, block 510 illustrates comparing the upper order bits of the effective address to the bits that are stored in each slot in the identified row, i.e. identified congruence class, in the set predict array.

Thereafter, block 512 depicts a determination of whether or not only one slot in this row includes the upper order bits of the effective address. If a determination is made that not just one slot includes the upper order bits, the process passes to block 514. A determination will be made that not just one slot includes the upper order bits when either no slot includes the upper order bits or two or more slots include the same upper order bits. A "hit" is determined to have occurred for each slot in this row that includes the upper order bits. Thus, if two slots include these upper order bits, two hits have occurred. If three slots include these upper order bits, three hits have occurred.

Referring again to block 512, if a determination is made that not just one slot includes the upper order bits, the process passes to block 514 which illustrates storing in a first hit counter the number of slots in this row that include the upper order bits of the effective address. Therefore, the number of hits that occurred is stored in a first hit counter. Next, block 516 depicts reloading this data from the system memory into the L1 data cache. The process then terminates as illustrated by block 518.

Referring again to block 512, if a determination is made that just one slot includes the upper order bits, the process passes to block 520 which illustrates selecting the slot in the identified row in the set predict array that includes the upper bits of the effective address. Two thread valid bits are stored in this slot, one for each thread. The process then passes to block 522 which depicts comparing the thread identifier that identifies this particular thread to its associated thread valid bit that is stored in this slot. Thus, the thread identifier is used to select one of the thread valid bits. The selected thread valid bit is the thread valid bit that is associated with the particular thread that needs to load the data.

Thereafter, block 524 illustrates a determination of whether or not the associated thread valid bit is set to "valid". If a determination is made that the associated thread valid bit is not set to "valid", i.e. it is set to "invalid", the process passes to block 516. Referring again to block 524, if a determination is made that the associated thread valid bit is set to "valid", the process passes to block 526 which depicts using the selected slot's location in the set predict array as a selection pointer into the data cache. Next, block 528 illustrates retrieving the data from the data cache that is stored in the slot whose location corresponds to the location of the slot selected in the set predict array. The process then terminates as depicted by block 518.

FIG. 6 illustrates a high level flow chart that depicts determining whether to reload data in accordance with the present invention. The process starts as depicted by block 600 and thereafter passes to block 602 which illustrates translation logic receiving an effective address (EA). Next, block 604 depicts the translation logic translating the effective address into a real address (RA). Block 606, then, illustrates using the lower order bits of the effective address to identify a particular row within the directory array. Next, block 608 illustrates comparing the upper order bits of the real address to the bits that are stored in each slot in the identified row in the directory array.

Thereafter, block 610 depicts a determination of whether or not only one slot in this row in the directory array includes the upper order bits of the real address. If a determination is made that not just one slot includes the upper order bits, the process passes to block 612. A determination will be made that not just one slot includes the upper order bits when either no slot includes the upper order bits or two or more slots includes the same upper order bits. A "hit" is determined to have occurred for each slot that includes the upper order bits. Thus, if two slots include these upper order bits, two hits have occurred. If three slots include these upper order bits, three hits have occurred.

Referring again to block 610, if a determination is made that not just one slot includes the upper order bits, the process passes to block 612 which illustrates storing in a second hit counter the number of slots in this row in the directory array that include the upper order bits of the real address. Therefore, the number of hits that occurred is stored in a second hit counter. Next, block 614 depicts sending a reject notice indicating that the data that was retrieved as depicted by FIG. 5 using the set predict array slot location is not usable. Thereafter, block 616 illustrates reloading this data from the system memory into the L1 data cache. The process then terminates as illustrated by block 618.

Referring again to block 610, if a determination is made that just one slot includes the upper order bits, the process passes to block 620 which illustrates selecting the slot in the identified row in the directory array that includes the upper bits of the real address. The process then passes to block 622 which depicts comparing the slot location of the slot that was selected from the set predict array, as depicted by FIG. 5, to the location of the slot that was selected from the directory array.

Thereafter, block 624 illustrates a determination of whether or not the slots are in the same locations in their respective arrays. If a determination is made that the slots are not in the same locations in their respective arrays, the process passes to block 614. Referring again to block 624, if a determination is made that the slots are in the same locations in their respective, the process terminates as illustrated by block 618.

Figure 7B:
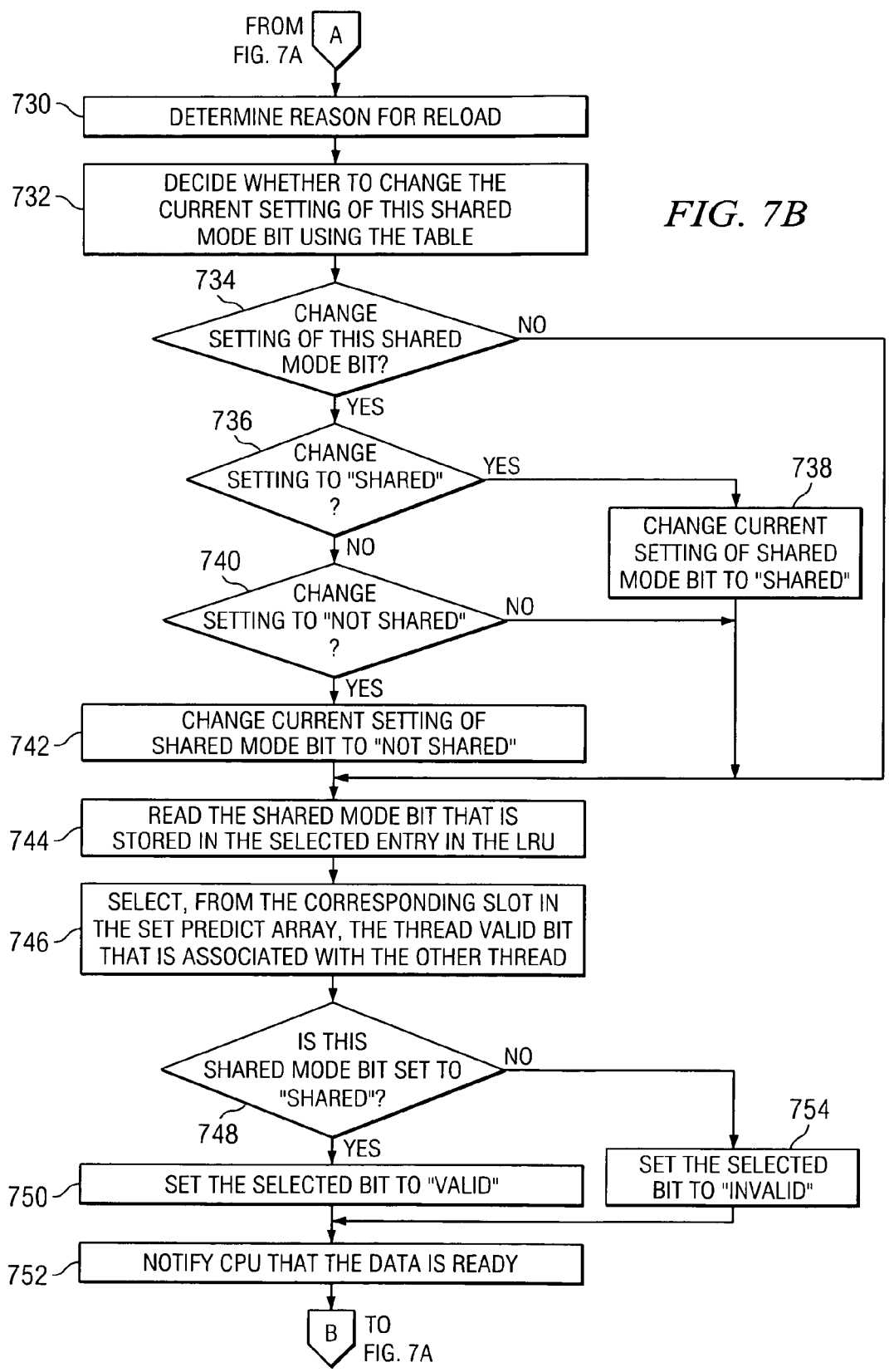

FIGS. 7A and 7B together depict a high level flow chart that illustrates utilizing a shared mode bit to determine whether data that is reloaded into the data cache will be shared in accordance with the present invention. The process starts as depicted by block 700 and thereafter passes to block 702 which illustrates a determination of whether or not data is to be reloaded into the data cache. If a determination is made that data is not to be reloaded, i.e. stored, into the data cache, the process passes back to block 702. If a determination is made that data is to be reloaded into the data cache, the process passes to block 704. The data that is to be reloaded is identified using a real address (RA). Block 704, then, depicts using the real address to retrieve the data from the system memory. The effective address has been generated for this real address. The process then passes to block 706 which illustrates determining a congruence class using the lower order bits of the effective address.

Block 708, then, depicts selecting an entry in the least recently used (LRU) array using the determined congruence class. Thereafter, block 710, illustrates determining a particular slot location that is identified in the selected entry in the LRU array. Next, block 712 depicts locating the determined congruence class in the data cache. The process then passes to block 714 which illustrates writing the data that was retrieved from the system memory into a slot in the located congruence class in the data cache. The data is written into the slot location that was identified by the LRU entry. Thereafter, block 716 depicts locating the determined congruence class in the directory array.

Block 718, then, illustrates writing the upper order bits of this data's real address into the directory array. The upper order bits of the real address is written into the slot that corresponds to the slot location that was identified by the LRU entry. Next, block 722 illustrates locating the determined congruence class in the set predict array using the lower order bits of the effective address. Thereafter, block 724 depicts writing the upper order bits of the effective address into the set predict array. The upper order bits of the effective address are written into the slot that corresponds to the slot location that was identified by the LRU entry.

Block 726, then, depicts selecting, from the corresponding slot in the set predict array, the thread valid bit that is associated with the thread that is responsible for causing the data to be reloaded. Two thread valid bits are stored in each slot of the set predict array. One of the thread valid bits is associated with the first thread while the other thread valid bit is associated with the second thread. Next, block 728 illustrates setting the selected bit, i.e. the bit selected in block 726, to be "valid". The process then passes to block 730 as depicted through connector A.

Block 730, then, illustrates determining the reason that caused the reloading of the data. This reason is determined by analyzing the number of set predict array hits that were recorded in the first hit counter, the number of directory array hits that were record in the second hit counter, and determining whether if one hit that occurred in the set predict array leads to only one hit in the data cache array. Next, block 732 depicts deciding whether to change the current setting of the shared mode bit that is associated with this congruence class. This is the shared mode bit that is stored in the selected LRU entry that is associated with this congruence class. This decision is made as described in the following table.

| Scenario | Number of directory array hits | Number of set predict hits | Set Predict hit = data cache hit | Shared mode bit action required |
|---|---|---|---|---|
| A | 2 or more | n/a | n/a | No change |
| B | 1 | 0 | n/a | Change to "shared" |
| C | 1 | 1 | Yes | No change |
| D | 1 | 1 | No | No change |
| E | 1 | 2 or more | n/a | Change to "not shared" |
| F | 0 | 0 | n/a | No change |
| G | 0 | 1 | n/a | Change to "not shared" |
| H | 0 | 2 or more | n/a | Change to "not shared" |

Scenario A occurs when two or more slots in the same congruence class in the directory contain the same real address and are valid. Scenario A results in a hardware error, as this case should never occur in normal processing. Scenario A does not require any change to the status of the corresponding Shared Mode Bit in the LRU.

Scenario B occurs when one slot hit occurs in the directory with a valid real address, but there is no corresponding hit in the Set Predict array. Scenario B occurs typically when a data, i.e., a cache line, re-reloaded for the other thread in non-shared mode, was written on top of the same cache line originally reloaded for this thread. Scenario B is an indication that the two threads are trying to share a cache line. The LSU should switch to shared to avoid thrashing. Scenario B requires a change to the current setting of the corresponding Shared Mode Bit in the LRU. In this, the corresponding shared mode bit is changed to "SHARED". When scenario B occurs, the Load instruction is rejected, a cache line from memory is reloaded to the directory array hit slot, both threads are marked as valid in the corresponding set predict array slot, and the CPU is notified to retry the load instruction. Scenario C happens as a result when the load instruction is resent by the CPU.

Scenario C occurs when one slot hits in the directory with a valid real address, and there is a corresponding hit in the set predict array. Scenario C is a typical cache hit scenario. Scenario C does not require any change to the current setting of the corresponding Shared Mode Bit in the LRU. When scenario C occurs the requested data is delivered to the CPU.

Scenario D occurs when one slot hits in the directory with a valid real address, and there is a non-corresponding hit in the Set Predict array. Scenario D occurs when there is an effective address alias condition. Scenario D does not require any change to the current setting of the corresponding Shared Mode Bit. When scenario D occurs, the Load instruction is rejected, and the thread valid bit is invalidated for the current thread in the slot that did hit in the Set Predict array. The CPU is notified to retry load instruction. Scenario B should then occur as a result when the load instruction is resent by the CPU.

Scenario E occurs when one slot hits in the directory with a valid real address, and there is more than one hit in the Set Predict array. Scenario E occurs typically when a cache line, reloaded for the other thread in shared mode, was written beside a cache line with a similar effective address originally reloaded for this thread. Scenario E requires a change to the current setting of the corresponding Shared Mode Bit in the LRU. The setting of the corresponding shared mode bit is set to "not shared". When scenario E occurs, the Load instruction is rejected, and the thread valid bit for the current thread in the non-corresponding slot that did hit in the Set Predict array is invalidated. The CPU is notified to retry the load instruction. Scenario D should then occur as a result when the load instruction is resent by the CPU.

Scenario F occurs when there are no hits in the directory with a valid real address nor in the Set Predict array. Scenario F is a typical cache miss scenario. Scenario F does not require any change to the current setting of the corresponding Shared Mode Bit. When scenario F occurs, the load instruction is rejected, memory is reloaded to an LRU indicated slot, the thread valid bit for the current thread is marked as valid in the Set Predict slot, and the thread valid bit for the other thread is marked as valid in the Set Predict slot in accordance with the setting of the Shared Mode Bit. The CPU is notified to retry the load instruction. Scenario C should then occur as a result when the load instruction is resent by the CPU.

Scenario G occurs when there are no hits in the directory with a valid real address, and there is a hit in the Set Predict array. Scenario G occurs typically when a cache line, reloaded for the other thread when in shared mode such that both thread valid bits were marked as being valid, and the cache line was written on top of a cache line with a similar effective address originally reloaded for this thread. Scenario G requires a change to the current setting of the corresponding Shared Mode Bit in the LRU. The corresponding shared mode bit is set to "not shared". When scenario G occurs, the Load instruction is rejected, a cache line from memory is reloaded to the Set Predict hit slot, the thread valid bit for the current thread is marked as being valid in the Set Predict slot, and the thread valid bit for the other thread is marked as being invalid in the Set Predict slot. The CPU is notified to retry load instruction. Scenario C typically occurs as a result when the load instruction is resent by the CPU.

Scenario H occurs when no slot hits in the directory with a valid real address, and there is more than one hit in the Set Predict array. Scenario H occurs typically when a cache line was reloaded for the other thread in shared mode such that both thread valid bits were marked as being valid, and the cache line was written beside a cache line with a similar effective originally reloaded for this thread. Scenario H requires a change to the current setting of the corresponding Shared Mode Bit in the LRU. The corresponding shared mode bit is set to "not shared". When scenario H occurs, the Load instruction is rejected, and the thread valid bit for the current thread is marked as invalid in either slot that did hit in the Set Predict array. The CPU is notified to retry the load instruction. Scenario G should then occur as a result when the load instruction is resent by the CPU.

The process then passes to block 734 which illustrates a determination of whether or not to change the current setting of this particular shared mode bit. If a determination is made that the current setting of this particular shared mode bit is not to be changed, the process passes to block 744.

Referring again to block 734, if a determination is made that the current setting of this particular shared mode bit is to be changed, the process passes to block 736 which illustrates a determination of whether or not to change the current setting to "shared". If a determination is made to change the current setting to "shared", the process passes to block 738 which depicts changing the current setting of this particular shared mode bit to "shared". The process then passes to block 744.

Referring again to block 736, if a determination is made that the current setting is not to be changed to "shared", the process passes to block 740 which illustrates a determination of whether or not to change the current setting to "not shared". If a determination is made to change the current setting to "not shared", the process passes to block 742 which depicts changing the current setting of this particular shared mode bit to "not shared. The process then passes to block 744.

Referring again to block 740, if a determination is made that the current setting is not to be changed to "not shared", the process passes to block 744.

Block 744 illustrates reading the shared mode bit that is stored in the selected entry in the LRU. Thereafter, block 746 depicts selecting, from the corresponding slot in the set predict array, the thread valid bit that is associated with the other thread that was not responsible for causing the data to be reloaded.

Next, block 748 illustrates a determination of whether or not this shared mode bit is set to "shared". If a determination is made that this shared mode bit is set to shared, the process passes to block 750 which depicts setting the selected thread valid bit, i.e. the bit selected in block 746, to be "valid". The process then passes to block 752.

Referring again to block 748, if a determination is made that the shared mode bit is not set to "shared", i.e. it is set to "not shared", the process passes to block 754 which illustrates setting the selected thread valid bit, i.e. the bit selected in block 746, to "invalid". The process then passes to block 752. Block 752, then, depicts notifying the CPU that the data is ready. The process then passes back to block 702 as depicted through connector B.

Figure 8B:
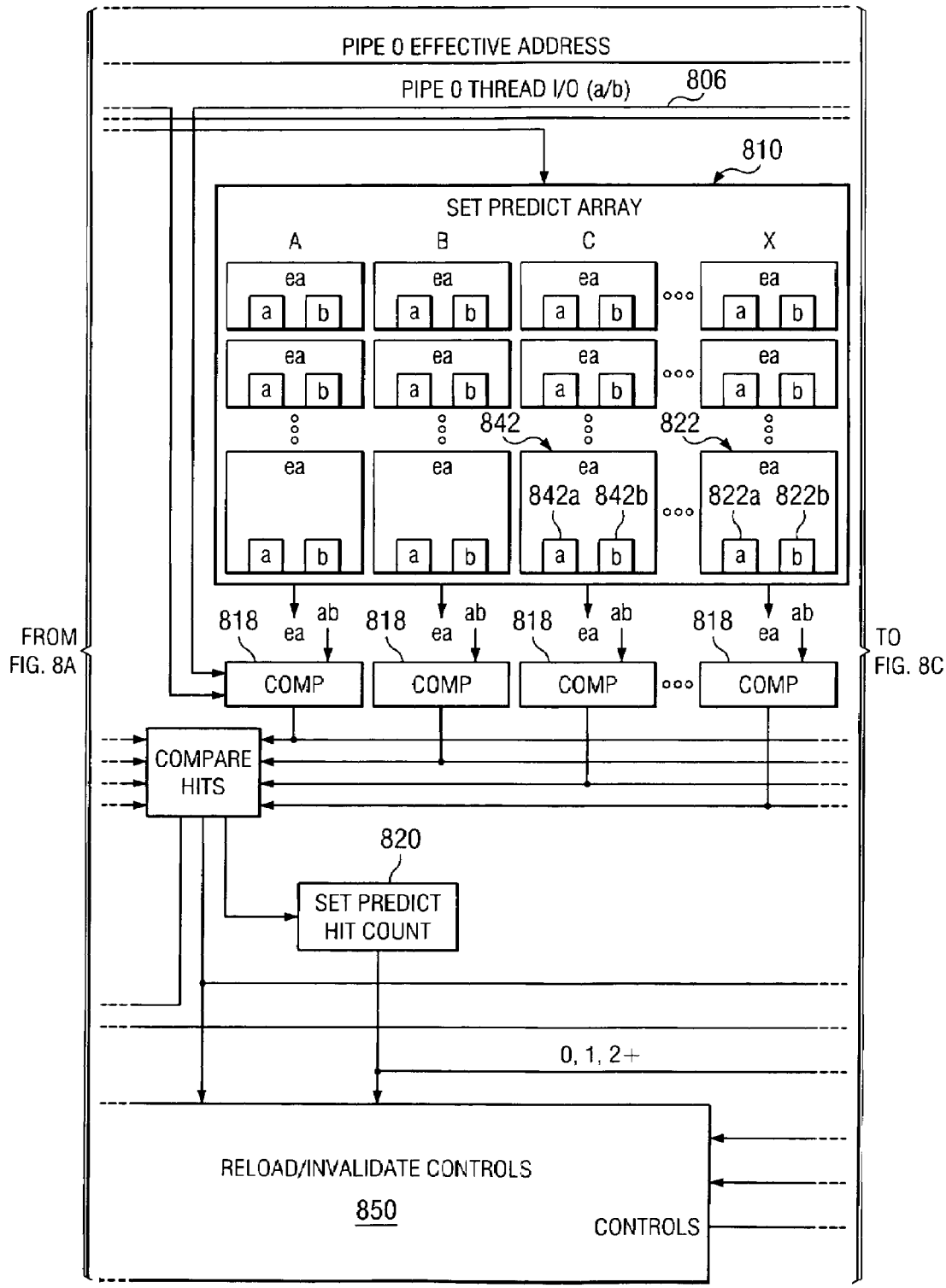
FIG. 8 is a block diagram of the system memory and a portion of the load/store unit that includes the present invention.

FIG. 8 is a block diagram of system memory and a portion of the load/store unit that includes the present invention. The portion 801 of load/store unit 124 receives data via a first pipe and a second pipe from a rest 802 of a processor core. The processing of data received via the first pipe is described in detail below.

The processor core generates an effective address 804 of the data to be retrieved and a thread identifier 806 that indicates which thread executed the instruction that requested the data. A translation mechanism 808 receives the effective address and generates the real address that corresponds to that effective address.

A set predict array 810, data cache array 812, and directory array 814 are provided. Each array includes the same number of rows 816 and the same number of columns. In the depicted example, each array includes three rows 816 and four columns. Each row is referred to herein as a cache congruence class (CCC) or just a congruence class. Of course those skilled in the art will recognize that many more rows and/or columns will typically be included.

The effective address 804 includes a first portion 804a that includes consecutive bits. Although these bits are lower order bits as depicted by the preferred embodiment, any portion of consecutive bits can be used. This first portion 804a of effective address 804 is used to select a particular row, or congruence class, in each array 810, 812, and 814.

Effective address 804 also includes a second portion 804b that includes consecutive bits. Any portion of consecutive bits can be used to implement second portion 804b. This second portion 804b of effective address 804 is used to select a particular slot within set predict array 810. If a slot in the selected congruence class in set predict array 810 contains portion 804b, a "hit" is determined to have occurred in set predict array 810. This portion 804b of the effective address has been referred to herein as upper order bits of the effective address.

Effective address 804 also includes a third portion 804c that includes consecutive bits. Any portion of consecutive bits can be used to implement third portion 804c. Effective address 804 is translated into a real address. The portion of the real address that has been translated from third portion 804c, is used to determine whether a hit has occurred in directory array 814. This portion of the real address is referred to herein as the upper order bits of the real address. If a slot in the selected congruence class in directory array 814 contains a real address portion that was translated from portion 804c, a "hit" is determined to have occurred in directory array 814.

The effective address 804 is provided to set predict array 810. The lower order bits 804a, of the address 804 are used to select one of the rows 816 which is one of the congruence classes. The contents of the selected row are provided to comparison logic 818. Comparison logic 818 compares the contents of each slot in the selected row to the upper order bits, i.e. second portion 804b, of the effective address 804. A "hit" occurs when one or more slots include these same upper order bits. When a hit occurs, it is indicated to set predict hit counter 820. Counter 820 counts the number of hits that occurred for a particular effective address in set predict array 810. Thus, if only one slot in that row included these upper order bits, i.e. second portion 804b, counter 820 would have a value of "1". If three slots in that row included these upper order bits, counter 820 would have a value of "3".

When the contents of the selected row are provided from set predict array 810, the current setting of each one of the thread valid bits is also provided. A thread valid bit is stored in each slot in set predict array 810 for each thread. Thus, if there are two threads, e.g. thread a and thread b, there will be two valid bits in each slot, one for thread a and one for thread b.

For example, slot 822 includes thread valid bit 822*a* for thread a and thread valid bit 822*b* for thread b. If thread valid bit 822*a* is set to "valid", the data in the slot 822*d* in data cache 812 that corresponds to slot 822 can be used by thread a. If thread valid bit 822*a* is set to "invalid", the data in the slot 822*d* in data cache 812 that corresponds to slot 822 cannot be used by thread a.

If thread valid bit 822*b* is set to "valid", the data in the slot 822*d* in data cache 812 that corresponds to slot 822 can be used by thread b. If thread valid bit 822*b* is set to "invalid", the data in the slot 822*d* in data cache 812 that corresponds to slot 822 cannot be used by thread b.

The thread identifier 806 is used to determine which thread requested the data. Thus, the appropriate one of the two thread valid bits is selected using thread identifier 806.

The slot identifier of the slot that included the upper order bits 804*b* of the effective address is used to locate the corresponding slot in the same row in data cache 812. The data that is stored in the corresponding slot is retrieved from data cache 812 and provided back to the processor core.

In parallel with this process, the real address that was generated by translation logic 808 is provided to directory array 814. The same cache congruence class, i.e. the same row, is selected in directory array 814 as was selected in both set predict array 810 and data cache 812. Comparison logic 824 is provided which then compares the contents of each slot in the selected row to upper order bits of the real address that correspond to third portion 804*c*. A "hit" occurs when one or more slots include these same upper order bits. When a hit occurs, it is indicated to directory hit counter 826. Counter 826 counts the number of hits that occurred for a particular real address in directory array 814. Thus, if only one slot in that row included these upper order bits, counter 826 would have a value of "1". If three slots in that row included these upper order bits, counter 826 would have a value of "3".

When data is to be reloaded into data cache 812, least recently used (LRU) array 830 is used to select the slot in data cache 812 into which the data will be stored. The congruence class of the data to be reloaded is used to select a particular entry from LRU array 830. For example, if it had been determined that the data stored in slot 822*d* was not good data, entry 832 will be selected from LRU array 830. The correct data would then be retrieved from system memory 834 and reloaded into data cache array 812 in the third row. The slot into which the data would be stored in cache 812 is determined using entry 832. Entry 832 will include a particular slot identifier that indicates the slot that is to be used in that congruence class. For example, if the slot identifier stored in entry 832 identified slot C, the data will be stored in slot 838.

The upper order bits of the real address that correspond to third portion 804*c* of this data will be stored in the corresponding slot in that congruence class in directory array 814. In this example, the upper order bits that correspond to third portion 804*c* of the real address will be stored in slot 840.

The upper order bits, i.e. second portion 804*b*, of the effective address of this data will be stored in the corresponding slot in that congruence class in set predict array 810. In this example, the upper order bits of the effective address will be stored in slot 842.

In addition, a separate shared mode bit is stored in LRU array 830 for each entry in the LRU array. There is a different shared mode bit for each congruence class. For example, shared mode bit 844 is stored in LRU array 830 for the third row. This shared mode bit will be set to either "shared" or "not shared".

In the example given above and assuming that thread a is responsible for the data being reloaded, if shared mode bit 844 is set to "shared", both thread valid bits 842*a* and 842*b* will be set to "valid". If shared mode bit 844 is set to "not shared", thread valid bit 842*a* will be set to valid and thread valid bit 842*b* will be set to "invalid".

Reload/invalidate controls 850 receives values from LRU array 830, the results from comparison logic 818 and 824, and hit counters 820 and 826. Reload/invalidate controls 850 generates appropriate control and/or invalidate signals and sends them to the appropriate units as depicted.

According to the present invention, the current setting of a particular shared mode bit may need to be changed. A decision as to whether or not to change the current setting is made by change logic 852. Change logic 852 receives the current values from hit counters 820 and 826, and the results from comparison logic 818 and 824. Change logic 852 determines whether to generate a signal that will change the current setting of a particular shared mode bit that is included within LRU array 830. Change logic 852 makes this decision based on the factors described above in the table.

Processor 101 is a multithreaded processor that is capable of concurrently processing two different threads. The threads share a first pipe and a second pipe. Both pipes share the single data cache 812. One thread is processed by each one of the pipes at a time. The pipes can, however, divide their time between the two threads. Thus, the first pipe can process instructions for the first thread for a time and then process instructions for the second thread for a time or vice versa. Similarly, the second pipe can process instructions for the first thread for a time and then process instructions for the second thread for a time or vice versa. The two pipes operate concurrently to process the various instructions.

Set predict array 810, directory array 814, translation mechanism 808, directory hit counter 826, set predict hit counter 820, change logic 852, comparison logic 818, and comparison logic 824 are all provided to process threads that arrive via the first pipe. The description provided above refers to the processing of threads that have arrived via the first pipe.

There is a single data cache 812 in the processor that is shared by both threads and both pipes.

In order to permit the concurrent accessing of the single data cache 812 by the two threads in both the first and second pipes concurrently, the present invention provides for a second set predict array 810*a*, a second directory array 814*a*, a second translation mechanism 808*a*, a second directory hit counter 826*a*, a second set predict hit counter 820*a*, a second change logic 852*a*, a second comparison logic 818*a*, and a second comparison logic 824*a*.

In a manner that is similar to that described above for the first pipe, i.e. pipe 0, set predict array 810*a*, directory array 814*a*, translation mechanism 808*a*, directory hit counter 826*a*, set predict hit counter 820*a*, change logic 852*a*, comparison logic 818*a*, and comparison logic 824*a* are all provided to process threads that arrive via the second pipe, pipe 1. Set predict array 810a, directory array 814a, translation mechanism 808a, directory hit counter 826a, set predict hit counter 820a, change logic 852a, comparison logic 818a, and comparison logic 824a all operate in a manner similar to that described above. In this manner, concurrent processing is accomplished using a single data cache 812 that can be concurrently accessed by threads that are being processed in two different pipes.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for sharing data in a cache among multiple threads in a simultaneous multi-threaded (SMT) processor, said SMT processor executing said multiple threads concurrently during each clock cycle, said method comprising:
   dynamically allocating said cache for use among said multiple threads;
   portions of said cache capable of being designated to store private data that is used exclusively by only a first one of said multiple threads;
   said portions of said cache capable of being designated to store shared data that is used by any one of said multiple threads;
   changing a size of said portions dynamically during execution of said multiple threads;
   storing a shared mode bit;
   said shared mode bit indicating whether data to be stored in said cache is to be shared among said multiple threads;
   said cache being an array that includes a plurality of different columns and a plurality of different rows;
   associating a different shared mode bit with each one of said plurality of different rows; and
   one of said shared mode bits indicating whether data that is stored in one of said plurality of rows that is associated with said one of said shared mode bits is to be shared among said multiple threads.

2. The method according to claim 1, further comprising:
   storing a plurality of different data in said cache;
   associating a validity indicator with each one of said multiple threads with each one of said plurality of different data; and
   said validity indicator indicating whether each one of said multiple threads can read each one of said plurality of different data, wherein said validity indicator is used to determine whether each one of said plurality of different data is public data or private data.

3. The method according to claim 2, further comprising:
   associating a thread identifier with each one of said multiple threads, said identifier identifying its associated thread; and
   selecting a validity indicator using said thread identifier.

4. The method according to claim 3, further comprising:
   attempting, by one of said multiple threads, to read one of said plurality of different data from said cache;
   identifying said one of said multiple threads by reading a thread identifier that is associated with said one of said multiple threads;
   locating a validity indicator for said one of said plurality of different data that is associated said one of said multiple threads that is identified by said thread identifier;
   determining a current value of said located validity indicator;
   in response to said current value being set to "valid", permitting said one of said multiple threads to read said one of said plurality of different data; and
   in response to said current value being set to "invalid", prohibiting said one of said multiple threads from reading said one of said plurality of different data.

5. The method according to claim 1, further comprising:
   associating a thread identifier with each one of said multiple threads, said identifier identifying its associated thread;
   associating a validity indicator with each one of said multiple threads;
   said validity indicator indicating whether each one of said multiple threads can read data that is associated with said validity indicator;
   attempting, by a first one of said multiple threads, to store particular data into said cache;
   storing said particular data into said cache;
   setting a validity indicator that is associated with said particular data and said first one of said multiple threads to "valid", said first one of said multiple threads being permitted to access said particular data when said validity indicator that is associated with said first one of said multiple threads is set to "valid";
   determining a current setting of said shared mode bit;
   in response to said current setting being set to "shared", setting a validity indicator that is associated with said particular data and associated with all others of said multiple threads to "valid", all others of said multiple threads being permitted to access said data when said validity indicator that is associated with all others of said multiple threads is set to "valid"; and
   in response to said current setting being set to "not shared", setting a validity indicator that is associated with said particular data and associated all others of said multiple threads to "invalid", all others of said multiple threads being prohibited from accessing said data when said validity indicator that is associated with all others of said multiple threads is set to "invalid".

6. The method according to claim 1, further comprising:
said cache being an array of a plurality of different data that is stored in a plurality of different data slots, said array including a plurality of different rows, each one of said plurality of different rows including a plurality of said plurality of different data slots;
selecting one of said plurality of data slots in one of said plurality of rows utilizing a directory array, said directory array including a plurality of different directory slots, said directory array including a plurality of different rows, each one of said plurality of different rows including a plurality of said plurality of different directory slots;
each one of said plurality of different directory slots corresponding directly to each one of said plurality of different data slots;
predicting, prior to selecting said one of said plurality of data slots utilizing said directory array, a selection of said one of said plurality of data slots utilizing a set predict array, said set predict array including a plurality of different set predict slots, said set predict array including a plurality of different rows, each one of said plurality of different rows including a plurality of said plurality of different set predict slots;
each one of said plurality of data slots corresponding directly within only one of said plurality of set predict slots and only one of said plurality of directory slots;
storing a plurality of different data in said plurality of different data slots in said cache;
associating a validity indicator with each one of said multiple threads and with each one of said plurality of different data; and
storing a validity indicator in each one of said plurality of set predict slots for each one of said multiple threads and with each one of said plurality of different data.

7. The method according to claim 6, further comprising:
associating a different shared mode bit with each one of said plurality of different rows of said cache; and
one of said shared mode bits indicating whether data that is stored in one of said plurality of rows that is associated with said one of said shared mode bits is to be shared among said multiple threads.

8. An apparatus in a data processing system for sharing data in a cache among multiple threads in a simultaneous multi-threaded (SMT) processor, said SMT processor executing said multiple threads concurrently during each clock cycle, said apparatus comprising:
said cache being dynamically allocating for use among said multiple threads;
portions of said cache capable of being designated to store private data that is used exclusively by only a first one of said multiple threads;
said portions of said cache capable of being designated to store shared data that is used by any one of said multiple threads;
a size of said portions being changed dynamically during execution of said multiple threads;
a shared mode bit;
said shared mode bit indicating whether data to be stored in said cache is to be shared among said multiple threads;
said cache being an array that includes a plurality of different columns and a plurality of different rows;
a different shared mode bit being associated with each one of said plurality of different rows; and
one of said shared mode bits indicating whether data that is stored in one of said plurality of rows that is associated with said one of said shared mode bits is to be shared among said multiple threads.

9. The apparatus according to claim 8, further comprising:
a plurality of different data stored in said cache;
a validity indicator associating with each one of said multiple threads with each one of said plurality of different data; and
said validity indicator indicating whether each one of said multiple threads can read each one of said plurality of different data, wherein said validity indicator is used to determine whether each one of said plurality of different data is public data or private data.

10. The apparatus according to claim 9, further comprising:
a thread identifier associating with each one of said multiple threads, said identifier identifying its associated thread; and
said thread identifier for selecting a validity indicator.

11. The apparatus according to claim 10, further comprising:
one of said multiple threads attempting to read one of said plurality of different data from said cache;
said data processing system including a CPU executing code for identifying said one of said multiple threads by reading a thread identifier that is associated with said one of said multiple threads;
said CPU executing code for locating a validity indicator for said one of said plurality of different data that is associated said one of said multiple threads that is identified by said thread identifier;
said CPU executing code for determining a current value of said located validity indicator;
in response to said current value being set to "valid", said CPU executing code for permitting said one of said multiple threads to read said one of said plurality of different data; and
in response to said current value being set to "invalid", said CPU executing code for prohibiting said one of said multiple threads from reading said one of said plurality of different data.

12. The apparatus according to claim 8, further comprising:
a thread identifier associated with each one of said multiple threads, said identifier identifying its associated thread;
a validity indicator associated with each one of said multiple threads;
said validity indicator indicating whether each one of said multiple threads can read data that is associated with said validity indicator;
a first one of said multiple threads attempting to store particular data into said cache;
said particular data being stored into said cache;
a validity indicator being set that is associated with said particular data and said first one of said multiple threads to "valid", said first one of said multiple threads being permitted to access said particular data when said validity indicator that is associated with said first one of said multiple threads is set to "valid";
said CPU executing code for determining a current setting of said shared mode bit;
in response to said current setting being set to "shared", said CPU executing code for setting a validity indicator that is associated with said particular data and associated with all others of said multiple threads to "valid", all others of said multiple threads being permitted to access said data when said validity indicator that is associated with all others of said multiple threads is set to "valid"; and in response to said current setting being set to "not shared", said CPU executing code for setting a validity indicator that is associated with said particular data and associated all others of said multiple threads to "invalid", all others of said multiple threads being prohibited from accessing said data when said validity indicator that is associated with all others of said multiple threads is set to "invalid".

13. The apparatus according to claim 8, further comprising:

said cache being an array of a plurality of different data that is stored in a plurality of different data slots, said array including a plurality of different rows, each one of said plurality of different rows including a plurality of said plurality of different data slots;

a directory array for selecting one of said plurality of data slots in one of said plurality of rows, said directory array including a plurality of different directory slots, said directory array including a plurality of different rows, each one of said plurality of different rows including a plurality of said plurality of different directory slots;

each one of said plurality of different directory slots corresponding directly to each one of said plurality of different data slots;

a set predict array for predicting, prior to selecting said one of said plurality of data slots utilizing said directory array, a selection of said one of said plurality of data slots, said set predict array including a plurality of different set predict slots, said set predict array including a plurality of different rows, each one of said plurality of different rows including a plurality of said plurality of different set predict slots;

each one of said plurality of data slots corresponding directly within only one of said plurality of set predict slots and only one of said plurality of directory slots;

said CPU executing code for storing a plurality of different data in said plurality of different data slots in said cache;

a validity indicator associated with each one of said multiple threads and with each one of said plurality of different data; and a validity indicator stored in each one of said plurality of set predict slots for each one of said multiple threads and with each one of said plurality of different data.

14. The apparatus according to claim 13, further comprising:

a different shared mode bit associated with each one of said plurality of different rows of said cache; and one of said shared mode bits indicating whether data that is stored in one of said plurality of rows that is associated with said one of said shared mode bits is to be shared among said multiple threads.

* * * * *